US011560130B2

(12) United States Patent
Westerhof et al.

(10) Patent No.: US 11,560,130 B2
(45) Date of Patent: Jan. 24, 2023

(54) CONTROL ALLOCATION FOR VEHICLE TORQUE

(71) Applicant: Dana Automotive Systems Group, LLC, Maumee, OH (US)

(72) Inventors: Bernhard E. Westerhof, Brussels (BE); Johan N. Van Ginkel, Melden (BE); Ahmed H. El-Shaer, Perrysburg, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 370 days.

(21) Appl. No.: 16/826,065

(22) Filed: Mar. 20, 2020

(65) Prior Publication Data

US 2021/0291801 A1   Sep. 23, 2021

(51) Int. Cl.
*B60W 10/119* (2012.01)
*B60W 10/02* (2006.01)
*B60W 50/00* (2006.01)

(52) U.S. Cl.
CPC .......... *B60W 10/119* (2013.01); *B60W 10/02* (2013.01); *B60W 2050/0022* (2013.01); *B60W 2520/14* (2013.01); *B60W 2520/20* (2013.01); *B60W 2520/40* (2013.01)

(58) Field of Classification Search
CPC .... B60W 30/045; B60W 10/20; B60W 10/22; B60W 2520/16; B60W 2520/18; B60W 2540/00; B60W 2720/16; B60W 2720/18; B60W 10/04; B60G 2204/62; B60G 2300/45; B60G 2400/40; B60G 2600/20; B60G 2800/012; B60G 2800/014; B60G 17/0162; B62D 1/04; B62D 1/12; B60K 2370/133

USPC ........................................................... 701/36
See application file for complete search history.

(56) References Cited

U.S. PATENT DOCUMENTS

| 5,540,298 A * | 7/1996 | Yoshioka ................ B62D 6/00 303/193 |
| 6,907,337 B2 | 6/2005 | Phillips et al. |
| 7,522,983 B2 | 4/2009 | Hashimoto et al. |
| 8,428,840 B2 * | 4/2013 | O'Dea ................... B60T 8/1755 701/90 |

(Continued)

FOREIGN PATENT DOCUMENTS

CN   103318155 A   9/2013

OTHER PUBLICATIONS

Sun, J. et al., "A Novel Torque Coordination Control Strategy of a Single-Shaft Parallel Hybrid Electric Vehicle Based on Model Predictive Control," Mathematical Problems in Engineering, vol. 2015, No. 960678, Jan. 5, 2015, 13 pages.

*Primary Examiner* — Jonathan M Dager
*Assistant Examiner* — Jean W Charleston
(74) *Attorney, Agent, or Firm* — McCoy Russell LLP

(57) ABSTRACT

Methods and systems are provided for using the weights of cost functions to improve linear-program-based vehicle driveline architectures and systems. In some embodiments, the methods and systems may include establishing values for driveline controls of a linear program based on driveline requests of the linear program. The values of the driveline controls, which may be used to adjust driveline actuators, may be established based on values of a plurality of weights of a cost function of the linear program, the weights respectively corresponding with the plurality of driveline requests.

16 Claims, 6 Drawing Sheets

(56) References Cited

U.S. PATENT DOCUMENTS

| | | | | |
|---|---|---|---|---|
| 11,333,085 B2* | 5/2022 | Janik | .................. | F02D 25/00 |
| 2008/0208420 A1* | 8/2008 | Wozniak | .................. | B60L 9/00 |
| | | | | 701/54 |
| 2010/0106603 A1* | 4/2010 | Dey | .................. | G08G 1/096888 |
| | | | | 705/14.63 |
| 2015/0259008 A1* | 9/2015 | Seguchi | .................. | B62D 15/025 |
| | | | | 701/41 |
| 2015/0345622 A1* | 12/2015 | Sujan | .................. | F16H 59/66 |
| | | | | 701/55 |
| 2017/0334420 A1* | 11/2017 | Kato | .................. | B60W 50/10 |
| 2018/0072308 A1* | 3/2018 | Miyaishi | .................. | B60W 20/40 |
| 2018/0178795 A1* | 6/2018 | Takada | .................. | F02N 11/0837 |
| 2018/0372200 A1* | 12/2018 | Kumar | .................. | B60K 6/442 |

\* cited by examiner

CONTROL ALLOCATION FOR VEHICLE TORQUE

FIELD

The present description relates generally to methods and systems related to vehicular driveline design.

BACKGROUND AND SUMMARY

Modern wheeled vehicles may employ a driveline system in which various dynamics subsystems are capable of requesting torque setpoints (e.g., on a per-wheel basis). In vehicle driveline architectures, vehicle dynamics subsystems may include, for example, subsystems for yaw control, subsystems for side-slip angle control, and/or subsystems for traction control. These requested torque setpoints may then become inputs to a control allocation subsystem, which may arbitrate between them to determine a torque distribution for the wheels of the vehicle (e.g., for each wheel of the vehicle).

In some vehicles, a control allocation subsystem may calculate an optimal torque distribution for the wheels based on a mathematical optimization, such as by linear programming (e.g., employing a simplex algorithm). Specific values in an augmented matrix of coefficients A of a linear program (which may be referred to as a control effectiveness matrix A) may then be adjusted to modify the torque distribution.

Under some conditions or sets of requests, a vehicle might be under-constrained (and/or over-actuated). In such cases, torque requests (and/or steering requests) may be satisfied by infinite combinations of motor torques. Under other conditions or sets of requests, however, a vehicle driveline system might be over-constrained (and/or under-actuated). Moreover, vehicle dynamics subsystems may sometimes request incompatible torque setpoints. In some cases, one or more of the actuators receiving the distributed torque may be limited, or may even have degraded.

Meanwhile, some vehicles may employ a type of four-wheel drive or all-wheel drive in which independent motors (e.g., electric motors) may be coupled to each wheel.

A rule-based approach to finding compatible torques in an arbitration may also be applied to vehicle driveline architectures and/or systems. In various methods and systems, by exploiting the properties of slack variables of a linear program, the computation of an optimal torque distribution for a specific cost function of the linear program (such a cost function $c^T x$) may advantageously prioritize vehicle dynamics requests (e.g., requests from vehicle dynamics subsystems, such as torque requests) based on that cost function.

By using the coefficients of the cost function (which may be referred to as the weights of the cost function) instead of the values of the control effectiveness matrix, there may advantageously be solutions available to the mathematical optimization used to calculate the torque distribution. Moreover, appropriate selection, such as described in more detail herein, of the weights of the cost function may facilitate or enable an explicit prioritization among possibly-incompatible control requests. The prioritization of vehicle dynamics requests may also advantageously assist vehicle driveline architectures and systems that can be either over-constrained or under-constrained, depending upon the specific set of requests provided to its control allocation subsystem (e.g., from its vehicle dynamics subsystems).

Accordingly, the potential issues described above related to vehicle driveline architectures may be addressed by the methods and systems disclosed herein. For example, some methods may comprise establishing values for a plurality of driveline controls of a linear program, and adjusting a plurality of driveline actuators based upon the values. The values for the plurality of driveline controls may be based upon a plurality of driveline requests of the linear program, and the driveline controls may respectively correspond with a plurality of driveline actuators. The values for the plurality of driveline controls may minimize a value of a cost function of the linear program, and may be established based on values of a plurality of weights of the cost function that correspond with the driveline requests. One or the driveline requests may be nullified by setting the values of one or more of the weights of the cost function to arbitrary high values, which may advantageously reduce constraints, obviate conflicting torque setpoints, and/or gracefully handle functionality-limited or failing driveline actuators.

By way of further example, in various embodiments, methods and systems may accommodate constraints (e.g., driveline requests) that may include total torque requests, total yaw moment requests, front and/or rear yaw moment requests, front and/or rear torque requests, max front and/or rear torque, individual torque limits and/or torque rate limits for each wheel and/or actuator, and traction control for each wheel. In some embodiments, an all-wheel drive, four-wheel drive, or individual-wheel drive vehicle may comprise methods and systems which may permit the nullification of one or more such constraints by setting the value of one or more weights of the cost function.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1A:
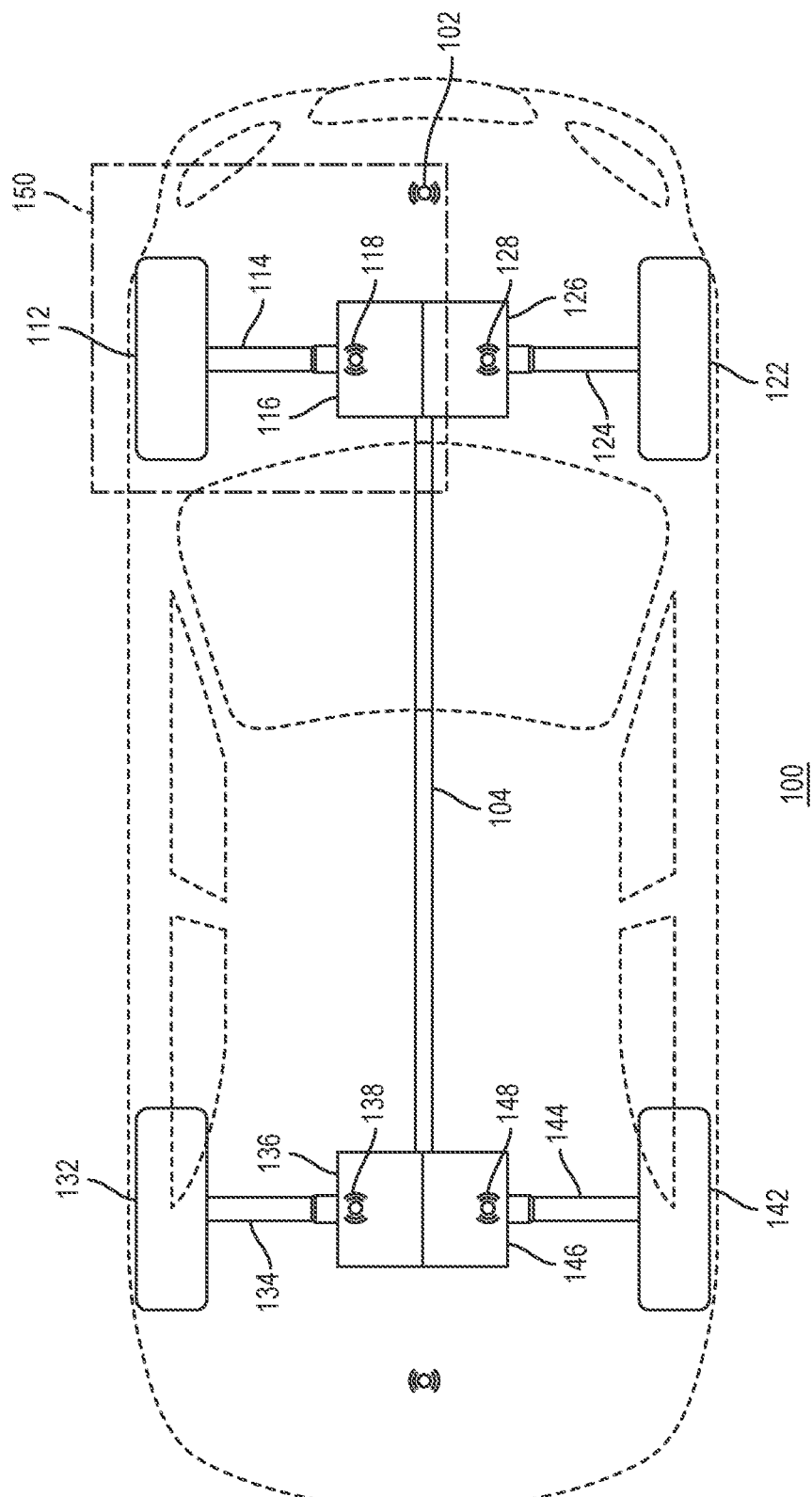
FIGS. 1A and 1B show cut-away top views of a vehicle having a driveline architecture in accordance with one or more embodiments of the present disclosure.
Figure 1B:
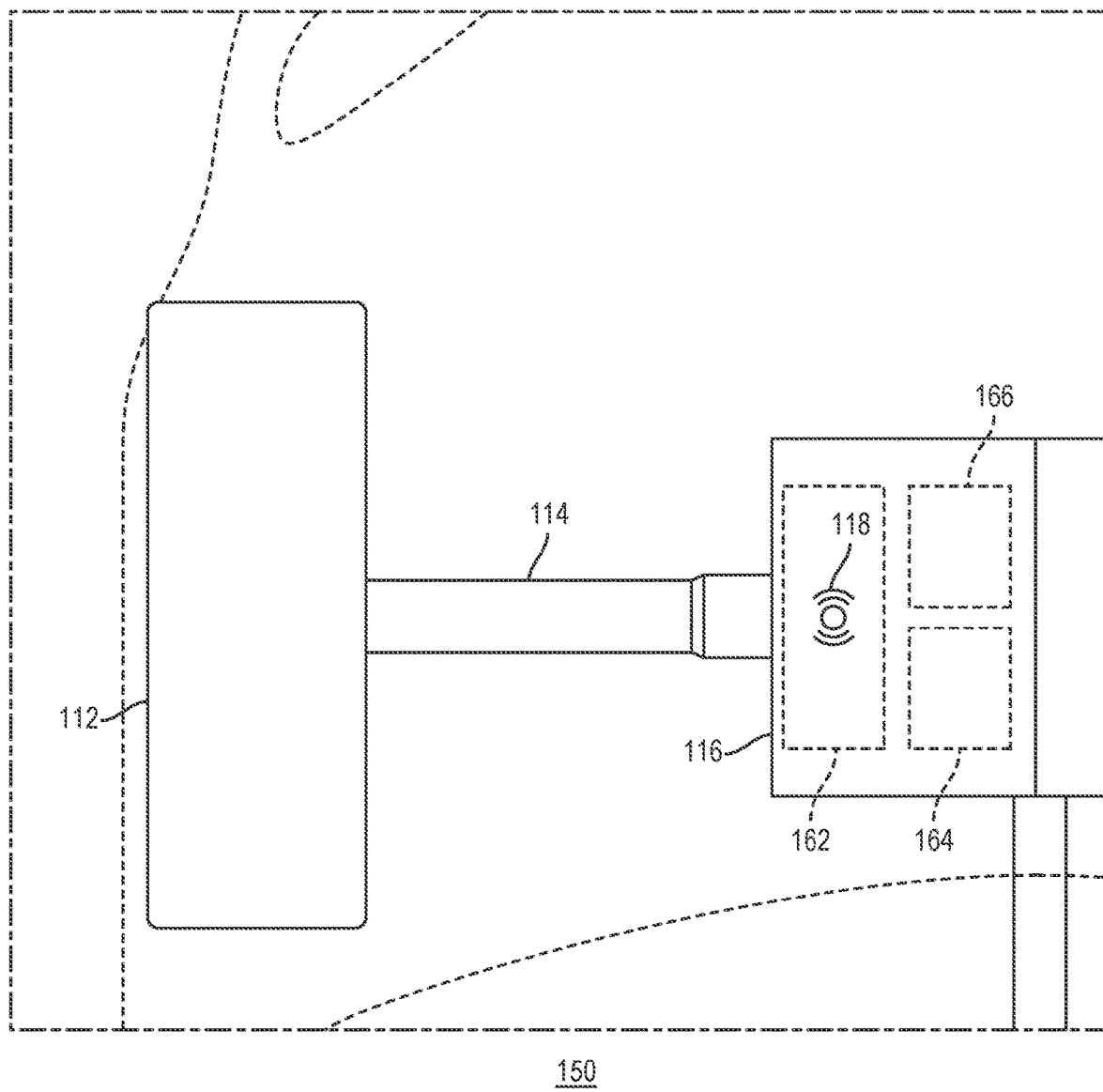
Figure 2:
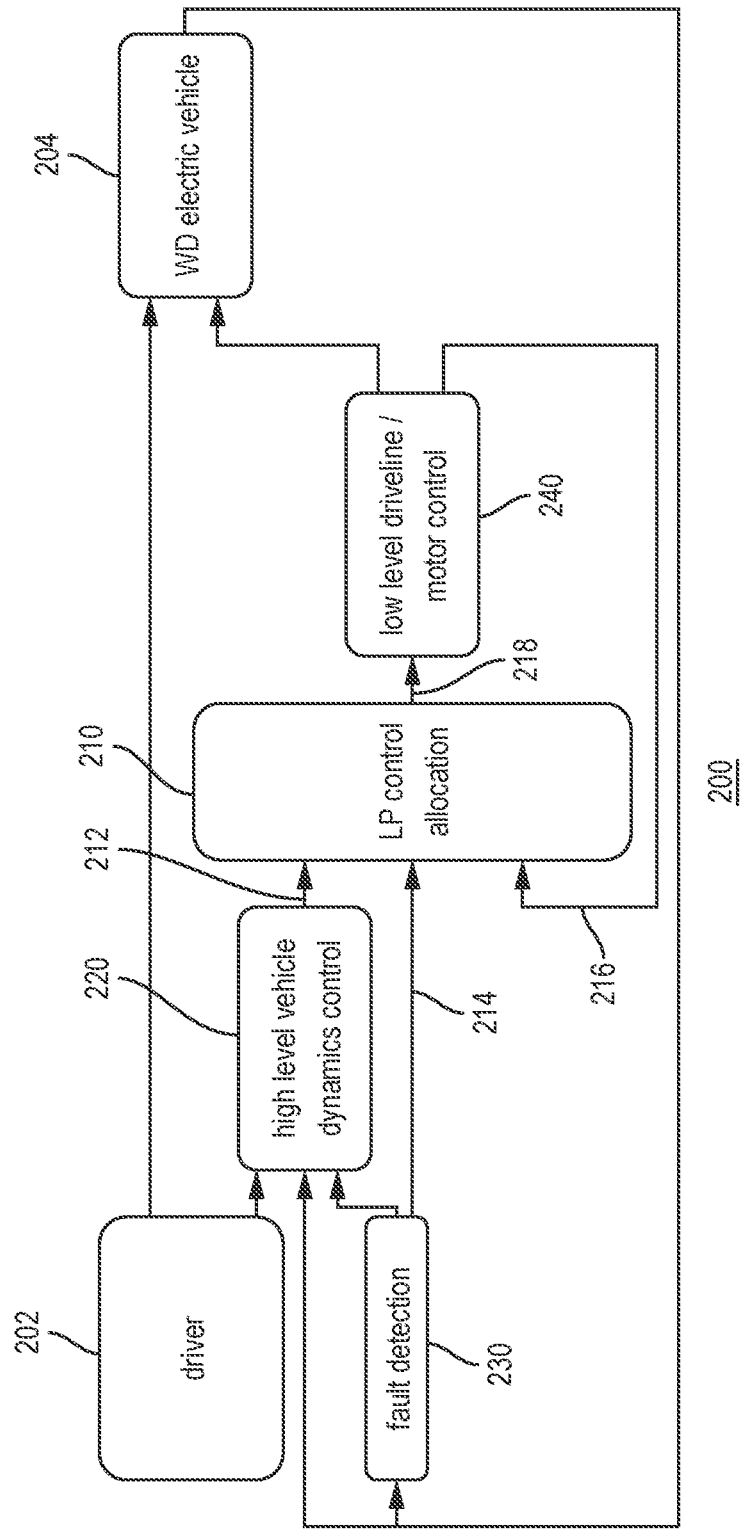
FIG. 2 shows a diagram of a driveline control architecture of a vehicle in accordance with one or more embodiments of the present disclosure.
Figure 3:
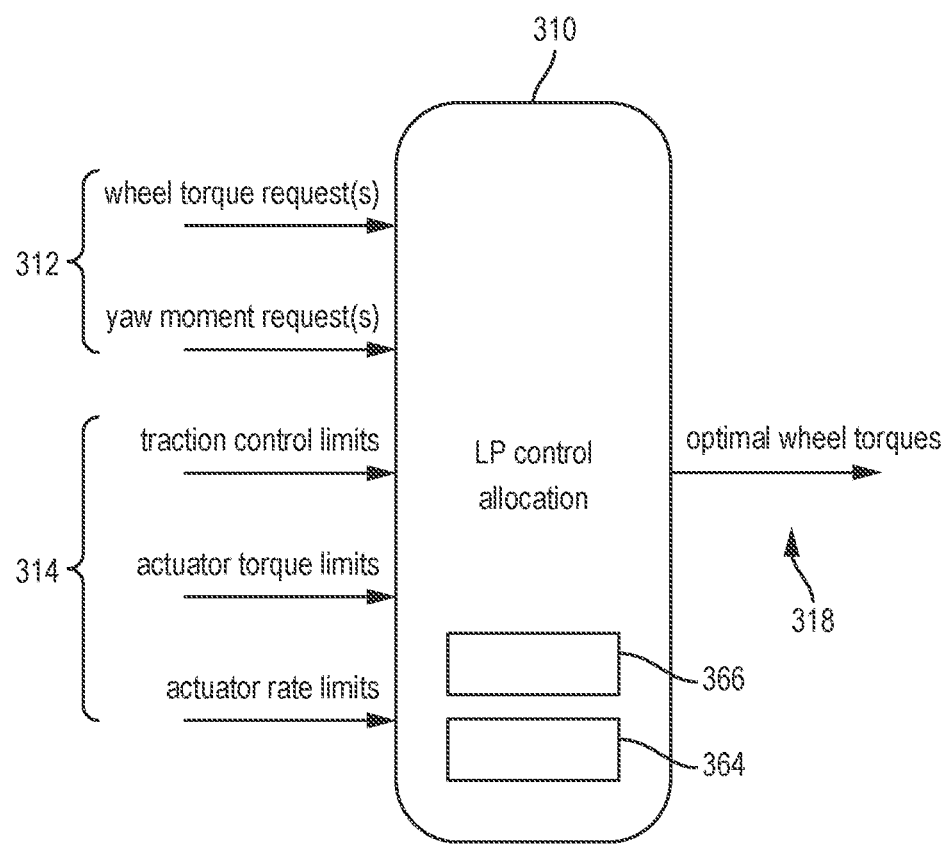
FIG. 3 shows a diagram of a control allocation subsystem of a driveline control architecture in accordance with one or more embodiments of the present disclosure.

Disclosed herein are methods and systems for using weights of cost functions to improve linear-program-based vehicle driveline architectures and systems. FIGS. 1A and 1B depict a vehicle having a driveline system with various wheels, drivelines, and motors, which may employ a linear-programming approach to optimizing driveline controls on the basis of driveline requests. FIGS. 2 and 3 depict portions of a driveline architecture having a control allocation subsystem. The structure of the linear programs employed (e.g., by the control allocation subsystem) may permit the use of weights of cost functions to prioritize various driveline requests.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments. Also, terminology in which elements are presented in a list using "and/or" language means any combination of the listed elements. For example, "A, B, and/or C" may mean any of the following: A alone; B alone; C alone; A and B; A and C; B and C; or A, B, and C.

FIGS. 1A and 1B show cut-away top views of a vehicle 100 having a driveline architecture capable of providing torque to four wheels simultaneously. In various embodiments, vehicle 100 may employ an all-wheel drive (AWD) driveline architecture, a four-wheel drive (4WD) driveline architecture, or an individual-wheel drive (IWD) driveline architecture. In alternate embodiments, a vehicle may employ a different type of driveline architecture, which may provide torque to more than four wheels simultaneously (such as a six-wheel drive (6WD) driveline architecture, an eight-wheel drive (8WD) driveline architecture), or which may provide torque to fewer than four wheels simultaneously (such as a two-wheel drive (2WD) driveline architecture). In various embodiments, vehicles may employ driveline architectures providing torque to any pluralities of wheels.

In accordance with the driveline architecture of vehicle 100, a driveline system of vehicle 100 comprises: (1) a first wheel 112 coupled to a first driveline 114 and a first motor 116; (2) a second wheel 122 coupled to a second driveline 124 and a second motor 126; (3) a third wheel 132 coupled to a third driveline 134 and a third motor 136; and (4) a fourth wheel 142 coupled to a fourth driveline 144 and a fourth motor 146. Drivelines 114, 124, 134, and 144 may apply torque from motors 116, 126, 136, and 146 to wheels 112, 122, 132, and 142.

For some embodiments, motors 116, 126, 136, and 146 may be, or may comprise, electric motors. Accordingly, some embodiments of vehicle 100 may comprise four wheels and four electric motors operative to supply torque independently to the four wheels.

In some embodiments, drivelines 114, 124, 134, and 144 may be, or may comprise, axles that couple motors 116, 126, 136, and 146 to wheels 112, 122, 132, and 142. In various embodiments, drivelines 114, 124, 134, and 144 may comprise any mechanism or assembly through which motors 116, 126, 136, and 146 may supply torque to wheels 112, 122, 132, and 142. In some embodiments, part of or all of drivelines 114, 124, 134, and 144 and/or part of or all of motors 116, 126, 136, and 146, may even be positioned within wheels 112, 122, 132, and 142.

The driveline system of vehicle 100 may comprise a control allocation subsystem, which may be coupled to drivelines 114, 124, 134, and 144. The control allocation subsystem of the driveline system may be implemented in, for example, a driveline control allocation circuitry and/or mechanism. In various embodiments, a control allocation algorithm employed by a control allocation subsystem may optimally distribute vehicle torques, including for possibly-conflicting torque setpoints, and may provide for fault-tolerant control allocation (e.g., for vehicles with four electric motors independently driving four wheels). In various embodiments, any driveline system having more than one independent actuator may advantageously benefit from fault-tolerant control mechanisms and methods such as those disclosed herein (such as driveline systems including clutch packs, twin combustion engines, front and rear electronically-limited slip differentials, and so on).

The driveline system may also comprise one or more dynamics subsystems, which may present various driveline requests (e.g., requested torque setpoints) to the control allocation subsystem. The dynamics subsystems may be coupled to one or more sensors 102 which may be positioned in a variety of locations on vehicle 100. The dynamics subsystems may also be coupled to one or more sensors associated with the motors, such as a first sensor 118, a second sensor 128, a third sensor 138, and a fourth sensor 148. Sensors 102, 118, 128, 138, and/or 148 may provide various types of information to the dynamics subsystems. For example, sensors 102, 118, 128, 138, and/or 148 may indicate to the dynamics subsystems that a driveline actuator (as discussed herein) is failing, or is otherwise functionally limited or impaired.

The various subsystems of the driveline system of vehicle 100 may be integrated within vehicle 100 in a variety of ways. In some embodiments, the control allocation subsystem may be substantially physically compact (e.g., employing a single, central mechanism and/or circuitry coupled individually to the drivelines), while the control allocation subsystem in other embodiments may be physically distributed (e.g., employing a plurality of mechanisms and/or circuitries coupled to the various drivelines). Similarly, the dynamics subsystems may be positioned relatively near to or relatively far from the control allocation subsystem (and/or physically distributed parts of the control allocation subsystem) within vehicle 100.

Vehicle 100 has a communications path 104, which may communicatively interconnect various components of vehicle 100. For example, communications path 104 may extend between first motor 116, second motor 126, third motor 136, fourth motor 146, and/or a centralized computer of vehicle 100, to carry signals, indicators, and so forth between those components. The dynamics subsystem and/or the control allocation subsystem may also be communicatively connected to communications path 104. Various driveline requests and various driveline controls may accordingly be communicated to various subsystems and components of vehicle 100 via communications path 104. Communications path 104 may follow any of a wide a variety of physical paths within vehicle 100, and may have a variety of physical manifestations conforming to a variety of communications architectures (e.g., a shared-bus architecture, or a distributed network architecture).

In some embodiments, signals may be carried by communications path 104 on specific wires (e.g., wires for driveline request signals and/or wires for driveline control signals), and in some embodiments, signals carried by communications path 104 may conform to a more complex signaling protocol. Accordingly, in various embodiments, signals or signaling may be carried on communications path 104 in relatively simple forms such as raw electrical pulses, or may alternatively be carried on communications path 104 in relatively complex forms, such as by electrical pulses that conform to a message-based communications protocol, a transmission-based communications protocol, or another higher-level communications protocol (which may be based ultimately in electrical pulses). Moreover, in various embodiments, the signals used could be analog in nature and/or digital in nature.

As a result of optimizing a linear program based on various driveline requests (as discussed herein), the control allocation subsystem may transmit various driveline controls to the motors and/or drivelines of vehicle 100. In various embodiments, the control allocation subsystem may transmit a first driveline control to first motor 116, a second driveline control to second motor 126, a third driveline control to third driveline motor 136, and a fourth driveline control to fourth motor 146. From there, the driveline controls may control actuators associated with motors 116, 126, 136, and 146; in turn, the actuators may allocate, distribute, or otherwise establish torques provided by motors 116, 126, 136, and 146 to wheels 112, 122, 132, and 142 (e.g., via drivelines 114, 124, 134, and 144). In some cases, the actuators may prevent motors 116, 126, 136, and 146 from providing torques to wheels 112, 122, 132, and 142. In various embodiments, the actuators may be torque actuators which provide specified torques (e.g. from motors 116, 126, 136, and 146 and/or via drivelines 114, 124, 134, and 144) to wheels 112, 122, 132, and 142.

For example, as depicted in FIG. 1B, the control allocation subsystem may transmit a driveline control to first motor 116 (e.g., via communications path 104), which may then control a first actuator 162 associated with first motor 116, and first actuator 162 may then prevent first motor 116 from providing a torque to first wheel 112 via first driveline 114. Similar structures may transmit driveline controls to motors 126, 136, and 146, which may then control actuators associated with those motors. In various embodiments, a plurality of driveline controls may be delivered to various motors (e.g., positive traction control and negative traction control for corresponding wheels).

In FIG. 1B, a first portion of the control allocation subsystem is depicted as being distributed to first motor 116. In some embodiments, the first portion may comprise a processor 164 and a memory 166 for storing instructions, which may be arranged to perform various operations. In alternate embodiments, however, the first portion of the control allocation subsystem may comprise logic devices or circuitry to perform the various operations of processor 164 and memory 166. In various embodiments, processor 164 and memory 166 may receive and/or process various driveline requests, and may generate and/or transmit various driveline controls (such as the driveline control transmitted to first motor 116).

Accordingly, based on values of driveline requests (e.g., from subsystems such as the dynamics subsystems), a vehicle driveline system may establish values for various driveline controls corresponding with various driveline actuators. The actuators may then be adjusted based on the values of the driveline controls, e.g., by preventing motors corresponding with the actuators from providing torque to wheels corresponding with the motors.

FIG. 2 shows a diagram of a driveline control architecture 200 of a vehicle. In various embodiments, driveline control architecture 200 may be in accordance with the vehicle driveline architecture of vehicle 100, and/or may be at least part of a driveline system of vehicle 100. Driveline control architecture 200 may comprise a control allocation subsystem 210, which may receive and/or process various driveline requests, and may generate and/or transmit various driveline controls.

On the driveline-request side, driveline control architecture 200 may comprise a high-level vehicle dynamics control subsystem 220, and a fault detection subsystem 230. Control allocation subsystem 210 may receive and/or process various driveline requests from other subsystems (e.g., in the form of signals and/or signaling, which might be carried on a communications path of the vehicle).

The driveline requests may include one or more driveline requests 212 from high-level vehicle dynamics control subsystem 220, one or more driveline requests 214 from fault detection subsystem 230, and/or one or more driveline requests 216 from a low-level driveline/motor control subsystem 240. Driveline requests 212 from high-level vehicle dynamics control subsystem 220 may comprise a total torque request (or another torque request), a yaw moment request, and/or one or more traction control limits. Driveline requests 214 from fault detection subsystem 230 and driveline requests 216 from low-level driveline/motor control subsystem 240 may comprise traction motor torque limits (e.g., by which a torque limit is "0" is a fault is detected).

On the driveline-control side, driveline control architecture 200 may also comprise low-level driveline/motor control subsystem 240. Control allocation subsystem 210 may also generate and/or transmit various driveline controls for other subsystems (e.g., in the form of signals and/or signaling, which might be carried on a communications path of the vehicle). The driveline controls may include one or more driveline controls 218 to low-level driveline/motor control subsystem 240. In some embodiments, low-level driveline/motor control subsystem 240 may comprise a low-level electrical machine control subsystem.

Moreover, as depicted in FIG. 2, in various embodiments, high-level vehicle dynamics control subsystem 220 may receive and/or process input from fault detection subsystem 230, and may also receive and/or process input from a driver 202 and/or from other portions 204 of the vehicle. For various embodiments, fault detection subsystem may also receive input from other portions 204 of the vehicle, and/or low-level driveline/motor control subsystem 240 may generate and/or transmit output for other portions 204 of the vehicle.

FIG. 3 shows a diagram of a control allocation subsystem 310 of a vehicle driveline architecture. In various embodiments, control allocation subsystem 310 may be in accordance with driveline control architecture 200, and/or may be at least part of driveline control architecture 200. Control allocation subsystem 310 may receive and/or process various driveline requests, and may generate and/or transmit various driveline controls.

On the driveline-request side, control allocation subsystem 310 may receive and/or process one or more driveline requests 312, which may comprise torque requests (e.g., wheel torque requests) and/or yaw moment requests. Control allocation subsystem 310 may also receive one or more driveline requests 314, which may comprise various limits such as traction control limits, actuator torque limits, and/or actuator rate limits. On the driveline-control side, control allocation subsystem 310 may generate and/or transmit one or more driveline controls 318, which may comprise one or more wheel torques 310 (such as optimized, or optimal wheel torques).

In various embodiments, a control allocation subsystem 310 (which may be in accordance with a driveline architecture 200 and/or a vehicle driveline architecture of vehicle 100) may establish the values for a number $N_C$ of driveline controls based upon a linear program encompassing a number $N_R$ of driveline requests. The linear program may set forth the following relationship between a constraint vector b (which may include values of the driveline requests), a variable vector x (which may include values of the driveline controls, as well as slack variables), a matrix of coefficients A, and a cost vector $c^T$:

$$\min_{x} c^T x$$
$$\text{s.t.} \quad Ax = b$$
$$x \geq 0$$

(In some embodiments, matrix of coefficients A may be referred to as a "control effectiveness matrix.") The cost function (or objective function) of the linear program may be $c^T x$ (e.g., the product of cost vector $c^T$ and variable vector x).

Constraint vector b may be a column vector having a number of entries equal to $N_R$ (e.g., the number of driveline requests). The $N_R$ entries of constraint vector b may accordingly correspond with the values of the $N_R$ driveline requests.

Variable vector x may be a column vector having a number of entries equal to $N_C$ plus two times $N_R$ (e.g., the sum of the number of driveline controls and twice the number of driveline requests). The first $N_C$ entries of vector of variables x may accordingly correspond with the values of the $N_C$ driveline controls, and the last $2*N_R$ entries of the vector of variables x may comprise a set of slack variables.

Matrix of coefficients A may be a matrix having a number of rows equal to $N_R$, and having a number of columns equal to $N_C$ plus two times $N_R$ (e.g., the sum of the number of driveline controls and twice the number of driveline requests). The first $N_C$ columns of matrix of coefficients A may correspond with the plurality of driveline controls. The last $2*N_R$ columns of the matrix of coefficients A may comprise an identity matrix having $N_R$ rows and $N_R$ columns (e.g., an $N_R$-by-$N_R$ identity matrix), and a negated identity matrix having $N_R$ rows and $N_R$ columns (e.g., a negated $N_R$-by-$N_R$ identity matrix).

Cost vector $c^T$ may be a row vector having a number of entries equal to $N_C$ plus two times $N_R$ (e.g., the sum of the number of driveline controls and twice the number of driveline requests). The first $N_C$ entries of cost vector $c^T$ may be zero, and the last $2*N_R$ entries of cost vector $c^T$ may comprise a plurality of weights. (Cost vector $c^T$, which is a row vector, may be a transpose of another cost vector c, which is a column vector; and the columns of cost vector $c^T$ may contain the same entries as the rows of cost vector c.)

Various parameters or features of the linear program may accordingly relate to the number $N_R$ of driveline requests and the number $N_C$ of driveline controls. Parameters or features related to the number $N_R$ may include: the number of entries in vector of constraints b; the number of rows of matrix of coefficients A; and the numbers of rows and columns of each of the identity matrix and the negated identity matrix in the last columns of matrix of coefficients A. Parameters or features related to twice the number $N_R$ may include: the number of slack variables in the last entries of variable vector x; and the numbers columns occupied by the identity matrix and the negated identity matrix in the last columns of matrix of coefficients A; and the number of weights in the last entries of cost vector $c^T$. The number $N_C$ may correspond to: the first entries of variable vector x; the number of columns before the identity matrix and the negated identity matrix of matrix of coefficients A; and the number of zeroes in the first entries of cost vector $c^T$.

Control allocation subsystem 310 may establish the values for the $N_C$ driveline controls based upon the linear program encompassing the $N_R$ driveline requests by optimizing (e.g., minimizing) the cost function $c^T x$ such that $Ax=b$, for $x \geq 0$. The $N_R$ driveline requests may thereby establish a distribution of, for example, torque values for the $N_C$ driveline controls. As a result, the values for the $N_C$ driveline controls may be established based on the weights in last entries of cost vector $c^T$. In turn, the weights may correspond with the various driveline requests. This may advantageously facilitate a rule-based approach to establishing the driveline controls, and the torques related to them.

For example, in various embodiments, at least one of the value of the $N_C$ driveline controls may be nullified by assigning arbitrary high values to one or more of the weights to the point at which zero torque is the optimal solution (e.g., the lowest resulting cost). In various embodiments, an arbitrary high value may be a relatively high value (e.g., a value that is much greater than the values of other weights). In some embodiments, an arbitrary high value may be a predetermined value. Moreover, for various embodiments in which arbitrary high values are assigned to more than one of the weights, the same value might be assigned to each such weight, or different values might be assigned to each such weight. In some embodiments, if a performance level of an actuator degrades, one or more of the weights may be altered (e.g., by control allocation subsystem 310) to reflect the degraded performance of the actuator. For some embodiments, if an actuator fails, one or more of the weights may be increased, and one or more driveline requests (e.g., associated with that actuator) may thereby be nullified in the linear program. Accordingly, the values of the weights may establish a prioritization among the set of driveline requests, up to and including completely deprioritizing (e.g., nullifying) one or more driveline requests.

As a result, if one or more of motors of a vehicle fail (or if another failure occurs, such as a steering actuator failure), a combination of remaining actuators may advantageously still be able to control the dynamics of vehicle 100 to some extent (and possible even to a full extent). Aside from full failure, actuators may also be limited by electro-mechanical properties (such as rate constraints), reduction in torque capacity (e.g., by temperature, or rotational velocity), or external factors (such as available road-tire friction), and prioritization among driveline requests may advantageously facilitate or enable adaptation to such limits.

In various embodiments, control allocation subsystem 310 may comprise a processor 364 and a memory 366 for storing instructions, which may be arranged to perform various operations, such as operations related to optimizing a linear program as described herein, or operations related to establishing the weights of cost vector $c^T$. In alternate embodiments, however, control allocation subsystem 310 may comprise logic devices or circuitry to perform the various operations of processor 364 and memory 366. In various embodiments, processor 364 and memory 366 may receive and/or process various driveline requests, and may generate and/or transmit various driveline controls. Moreover, memory 366 of control allocation subsystem 310 may store constraint vector b, variable vector x, matrix of coefficients A, and cost vector $c^T$, including the weights of cost vector $c^T$.

Notably, the modification of weights in the cost function may permit the use of an algorithm similar to algorithms used for other driveline systems incorporating linear programs as discussed herein, which may advantageously improve a flexibility of the driveline architecture. By modifying the weights in the cost function, the methods and systems discussed herein may thus advantageously augment the processing and handling of fault-detection and electromechanical properties of actuators as well as traction and stability control.

In various embodiments, electric motors of vehicles may have various constraints, which may include: electric-motor control loops (with electro-mechanical limits and rate constraints); fault detection algorithms; and high-level vehicle dynamics with traction control limits. The methods and systems discussed herein may advantageously combine various such constraints for each electric motor.

Although linear programming is described herein as being used to perform the optimization (e.g., the minimization), in other embodiments, other optimization algorithms may be applied as well.

A first example of a linear program in accordance with the systems and methods discussed herein is given as:

$$\min_{x} c_1^T x_1$$

$$\text{s.t. } A_1 x_1 = b_1$$

$$x_1 \geq 0$$

The first linear program includes a first constraint vector $b_1$, a first variable vector $x_1$, a first matrix of coefficients $A_1$, and a first cost vector $c_1^T$. The first example linear program pertains to 13 driveline requests ($N_R$=13) and 6 driveline controls ($N_C$=6).

First constraint vector $b_1$ of the first linear program is defined as:

$$b_1 = \begin{bmatrix} T_{req,tot} \\ M_{z,tot} \\ M_{z,Fr} \\ T_{req,Re} \\ T_{max,Re} \\ T_{TC,FrL} \\ T_{TC,FrR} \\ T_{TC+,ReL} \\ T_{TC+,ReR} \\ T_{TC-,ReL} \\ T_{TC-,ReR} \\ T_{max,ReL} \\ T_{max,ReR} \end{bmatrix}$$

As defined, the 13 entries (the $N_R$ entries) of first constraint vector $b_1$ are values of various driveline requests: a total torque request ($T_{req,tot}$); a total yaw moment request ($M_{z,tot}$); a front yaw moment target ($M_{z,Fr}$); a rear torque request ($T_{req,Re}$); a maximum rear torque ($T_{max,Re}$); a front-left-wheel traction control ($T_{TC,FrL}$); a front-right-wheel traction control ($T_{TC,FrR}$); a rear-left-wheel positive traction control ($T_{TC+,ReL}$); a rear-right-wheel positive traction control ($T_{TC+,ReR}$); a rear-left-wheel negative traction control ($T_{TC-,ReL}$); a rear-right-wheel negative traction control ($T_{TC-,ReR}$); a maximum rear-left-wheel torque ($T_{max,ReL}$); and a maximum rear-right-wheel torque ($T_{max,ReR}$).

First variable vector $x_1$ of the first linear program is defined as:

$$x_1 = \begin{bmatrix} T_{FrL} \\ T_{FrR} \\ T_{ReL}^+ \\ T_{ReR}^+ \\ T_{ReL}^- \\ T_{ReR}^- \\ s_1^+ \\ \vdots \\ s_{13}^+ \\ s_{14}^- \\ \vdots \\ s_{26}^- \end{bmatrix}$$

As defined, the first 6 entries (the first $N_C$ entries) of first variable vector $x_1$ are values of driveline controls for various torques: a front-left-wheel torque ($T_{FrL}$), a front-right-wheel torque ($T_{FrR}$), a rear-left-wheel positive torque ($T_{ReL}^+$), a rear-right-wheel positive toque ($T_{ReR}^+$), a rear-left-wheel negative torque ($T_{ReL}^-$), and a rear-right-wheel negative torque ($T_{ReR}^-$). The last 26 entries (the last $2*N_R$ entries) of first variable vector $x_1$ are a set of slack variables $s_1^+$ to $s_{13}^+$ and $s_{14}^-$ to $s_{26}^-$.

First matrix of coefficients $A_1$ of the first linear program is defined as:

$$A_1 = \begin{bmatrix} 1 & 1 & 1 & 1 & -1 & -1 \\ \frac{r}{R} & \frac{r}{R} & -\frac{r}{R} & \frac{r}{R} & \frac{r}{R} & -\frac{r}{R} \\ -\frac{r}{R} & \frac{r}{R} & 0 & 0 & 0 & 0 \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 1 & 0 & -1 & 0 \\ 0 & 0 & 0 & 1 & 0 & -1 \\ 0 & 0 & 1 & 0 & -1 & 0 \\ 0 & 0 & 0 & 1 & 0 & -1 \\ 0 & 0 & 1 & 0 & -1 & 0 \\ 0 & 0 & 0 & 1 & 0 & -1 \end{bmatrix} \begin{pmatrix} I^{13\times 13} \end{pmatrix} \begin{pmatrix} -I^{13\times 13} \end{pmatrix}$$

As defined, first matrix of coefficients $A_1$ has 13 rows ($N_R$) and $6+(2*13)=32$ columns ($N_C$ plus $2*N_R$ columns). The first 6 columns ($N_C$ columns) of first matrix of coefficients $A_1$ may correspond with the driveline controls, and the last $2*13=26$ columns ($2*N_R$ columns) of first matrix of coefficients $A_1$ may comprise a 13-by-13 identity matrix $I^{13\times 13}$ and a 13-by-13 negated identity matrix $-I^{13\times 13}$. The entries of the first 6 columns of first matrix of coefficients $A_1$ include values based on half of the vehicle track width (r) and an effective wheel radius (R) relating the wheel torques to the yaw moment torques.

First cost vector $c_1^T$ of the first linear program is defined as:

$$c_1^T = [0\ 0\ 0\ 0\ 0\ 0\ c_1\ \ldots\ c_{13}\ c_{14}\ \ldots\ c_{26}]$$

As defined, the first 6 entries (the first $N_C$ entries) of first cost vector $c_1^T$ contain zeroes. The last $2*13=26$ entries (the last $2*N_R$ entries) of first cost vector $c_1^T$ contain $c_1$ to $c_{13}$ and $c_{14}$ to $c_{26}$, which together comprise a set of weights of first cost vector $c_1^T$.

A control allocation subsystem (such as control allocation subsystem 310) as discussed herein may thus establish the values for the 6 driveline controls (the $N_C$ driveline controls)

of first variable vector $x_1$, based upon the 13 driveline requests (the $N_R$ driveline requests) of first constraint vector $b_1$, by optimizing (e.g., minimizing) the cost function $c_1^T x_1$ (such that $A_1 x_1 = b_1$, for $x_1 \geq 0$) in accordance with the first exemplary linear program. The values of weights $c_1$ to $c_{13}$ and $c_{14}$ to $c_{26}$ of first cost vector $c_1^T$ may advantageously be adjusted to adjust the priority of the various driveline requests (which may include completely deprioritizing one or more driveline requests).

With reference to the first exemplary linear program, in various embodiments, different wheel torques may be related to different requests (e.g., to a control allocation subsystem) in a linear program via first matrix of coefficients $A_1$. Each row in first matrix of coefficients $A_1$ may correspond to a request, such as: a total driver torque; a yaw moment (damping or amplification); or a limit of the driveline technology, such as maximum clutch torque or clutch rate. Changing the values of values of weights $c_1$ to $c_{13}$ and $c_{14}$ to $c_{26}$ of first cost vector $c_1^T$ may advantageously allow for the enabling and/or prioritizing of different control requests. Accordingly, the first exemplary linear program may accommodate optimization between parameters such as total torque request, rear torque request, maximum rear torque, total yaw moment request, front yaw moment target, traction control for each wheel, max rear clutch torques, and/or clutch torque rates.

A second example of a linear program in accordance with the systems and methods discussed herein is given as:

$$\min_x c_2^T x_2$$
$$\text{s.t. } A_2 x_2 = b_2$$
$$x_2 \geq 0$$

The second linear program includes a second constraint vector $b_2$, a second variable vector $x_2$, a second matrix of coefficients $A_2$, and a second cost vector $c_2^T$. The second example linear program pertains to 6 driveline requests ($N_R = 6$) and 8 driveline controls ($N_C = 8$).

Second constraint vector $b_2$ of the second linear program is defined as:

$$b_2 = \begin{bmatrix} T_{req,tot} \\ M_{z,tot} \\ T_{max,FrL} \\ T_{max,FrR} \\ T_{max,ReL} \\ T_{max,ReR} \end{bmatrix}$$

As defined, the 6 entries (the $N_R$ entries) of second constraint vector $b_2$ are values of driveline requests: a total torque request ($T_{req,tot}$); a total yaw moment request ($M_{z,tot}$); a front-left-wheel maximum torque ($T_{max,FrL}$); a front-right-wheel maximum torque ($T_{max,FrR}$); a rear-left-wheel maximum torque ($T_{max,ReL}$); and a rear-right-wheel maximum torque ($T_{max,ReR}$).

Second variable vector $x_2$ of the second linear program is defined as:

$$x_2 = \begin{bmatrix} T_{FrL}^+ \\ T_{FrR}^+ \\ T_{FrL}^- \\ T_{FrR}^- \\ T_{ReL}^+ \\ T_{ReR}^+ \\ T_{ReL}^- \\ T_{ReR}^- \\ s_1^+ \\ \vdots \\ s_6^+ \\ s_7^- \\ \vdots \\ s_{12}^- \end{bmatrix}$$

As defined, the first 8 entries (the first $N_C$ entries) of second variable vector $x_2$ are values of driveline controls for various torques: a front-left-wheel positive torque ($T_{FrL}^+$); a front-right-wheel positive torque ($T_{FrR}^+$); a front-left-wheel negative torque ($T_{FrL}^-$); a front-right-wheel negative torque ($T_{FrR}^-$); a rear-left-wheel positive torque ($T_{ReL}^+$); a rear-right-wheel positive torque ($T_{ReR}^+$); a rear-left-wheel negative torque ($T_{ReL}^-$); and a rear-right-wheel negative torque ($T_{ReR}^-$). The last 12 entries (the last $2*N_R$ entries) of second variable vector $x_2$ are a set of slack variables $s_1^+$ to $s_6^+$ and $s_7^-$ to $s_{12}^-$.

Second matrix of coefficients $A_2$ of the second linear program is defined as:

$$A_2 = \begin{bmatrix} 1 & 1 & -1 & -1 & 1 & 1 & -1 & -1 \\ -\frac{r}{R} & \frac{r}{R} & \frac{r}{R} & -\frac{r}{R} & -\frac{r}{R} & \frac{r}{R} & \frac{r}{R} & -\frac{r}{R} \\ 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix} \begin{pmatrix} I^{6\times6} \end{pmatrix} \begin{pmatrix} -I^{6\times6} \end{pmatrix}$$

As defined, second matrix of coefficients $A_2$ has 6 rows ($N_R$) and $8+(2*6)=20$ columns ($N_C$ plus $2*N_R$ columns). The first 8 columns ($N_C$ columns) of second matrix of coefficients $A_2$ may correspond with the driveline controls, and the last $2*6=12$ columns ($2*N_R$ columns) of second matrix of coefficients $A_2$ may comprise a 6-by-6 identity matrix $I^{6\times6}$ and a 6-by-6 negated identity matrix $-I^{6\times6}$. The entries of the first 8 columns of second matrix of coefficients $A_2$ include values based on r and R.

Second cost vector $c_2^T$ of the second linear program is defined as:
$c_2^T = [0\ 0\ 0\ 0\ 0\ 0\ 0\ 0\ c_1\ \ldots\ c_6\ c_7\ \ldots\ c_{12}]$ As defined, the first 8 entries (the first $N_C$ entries) of second cost vector $c_2^T$ contain zeroes. The last $2*6=12$ entries (the last $2*N_R$ entries) of second cost vector $c_2^T$ contain $c_1$ to $c_6$ and $c_7$ to $c_{12}$, which together comprise a set of weights of second cost vector $c_2^T$.

A control allocation subsystem (such as control allocation subsystem 310) as discussed herein may thus establish the values for the 8 driveline controls (the $N_C$ driveline controls) of second variable vector $x_2$, based upon the 6 driveline requests (the $N_R$ driveline requests) of second constraint vector $b_2$, by optimizing (e.g., minimizing) the cost function $c_2^{Tx}{}_2$ (such that $A_2 x_2 = b_2$, for $x_2 \geq 0$) in accordance with the second exemplary linear program. The values of weights $c_1$ to $c_6$ and $c_7$ to $c_{12}$ of second cost vector $c_2^T$ may advantageously be adjusted to adjust the priority of the various driveline requests (which may include completely deprioritizing one or more driveline requests).

With reference to the second exemplary linear program, in various embodiments, depending on design requirements, a second matrix of coefficients $A_2$ and a cost function $c_2^T x_2$ (and/or cost vector $c_1^T$) may be extended to prioritize constraints. For example, by adding extra rows in second matrix of coefficients $A_2$ (e.g., for traction control limits) and assigning those rows lower weights (e.g., via weights $c_1$ to $c_6$ and $c_7$ to $c_{12}$), traction control limits may be exceeded in cases in which a driver torque request is high, but the electro-mechanical limits of the electric motors or an actuator failure may still be respected, and the control allocation (e.g., of a control allocation subsystem) may find an optimal solution to track the total torque request and/or the yaw moment request. Moreover, by changing the weights in the linear program, instead of making changes to second matrix of coefficients $A_2$, the algorithm may be more physically correct, since the kinematic relationship between wheel torques and, e.g., yaw moment might not depend on actuator limits.

In various embodiments, for fault tolerant control in cases in which a steering actuator fails, high-level vehicle dynamics may modify a yaw moment request to compensate for the lack of steering actuation.

Accordingly, with respect to FIGS. 1A through 3, a system for controlling drivelines of a vehicle may comprise four driveline controls for controlling four actuators, and one or more driveline control allocation circuitries (e.g., such as control allocation subsystem 310) operable to establish a distribution of four torque values for the four driveline controls based on values of a plurality of driveline requests. The four torque values may correspond with a minimized value of a cost function of a linear program. At least one of the values of the plurality of driveline requests may be nullified by assigning arbitrary high values to one or more of a plurality of weights of the cost function.

In some embodiments, at least one of the four actuators may be a torque actuator. For some embodiments, the distribution of the four torque values may be established by a single driveline control allocation circuitry. In some embodiments, the values of the plurality of the plurality of driveline requests may be established by one or more dynamics subsystems. For some embodiments, the one or more dynamics subsystems may comprise a subsystem for yaw control, a subsystem for side-slip angle control, and/or a subsystem for traction control.

Figure 4:
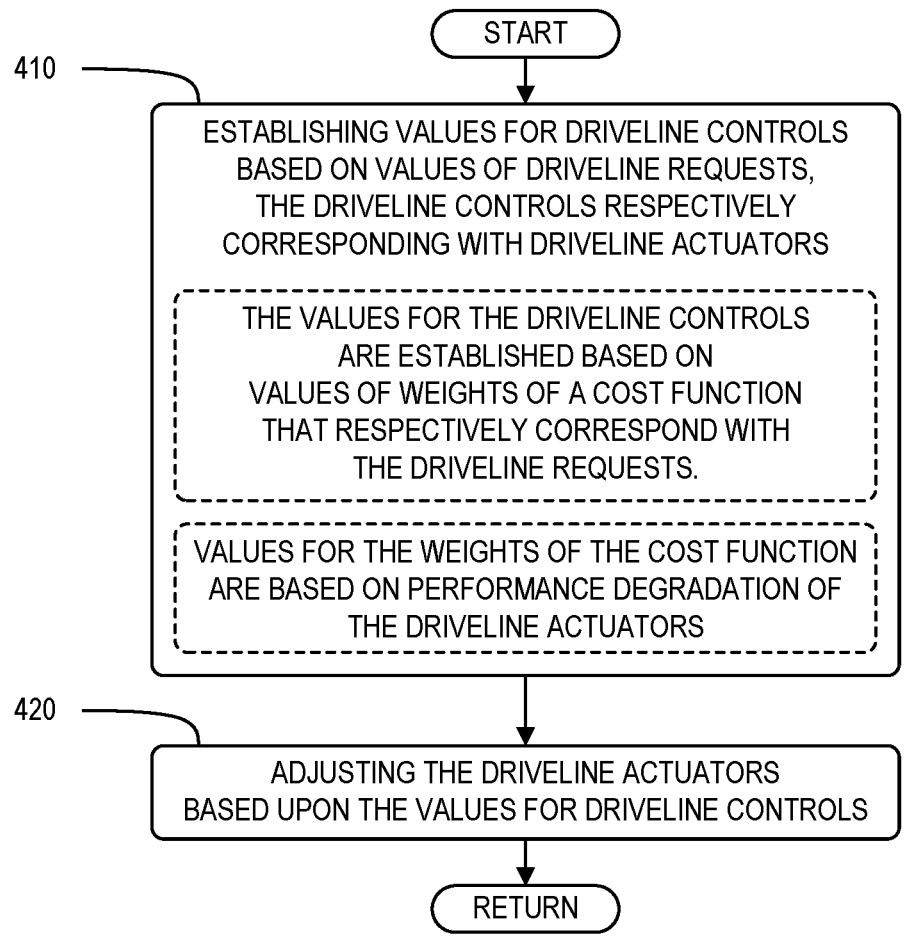
FIG. 4 shows a flow chart of a method for establishing values for driveline controls in accordance with one or more embodiments of the present disclosure.

FIG. 4 shows a flow chart of a method 400 for establishing values for driveline controls. Method 400 may comprise a first portion 410 and a second portion 420. In first portion 410, values may be established for a plurality of driveline controls of a linear program (e.g., driveline controls for a control allocation subsystem such as control allocation subsystem 310) based on values of a plurality of driveline requests of the linear program (e.g., driveline request for a control allocation subsystem such as control allocation subsystem 310). The driveline controls may respectively correspond with a plurality of driveline actuators. In second portion 420, the plurality of driveline actuators may be adjusted based upon the values for the plurality of driveline controls.

In some embodiments, the values for the plurality of driveline controls may be established based on values of a plurality of weights of a cost function of the linear program, the plurality of weights respectively corresponding with the plurality of driveline requests. For some embodiments, values for one or more of the weights of the cost function may be based on performance degradation of one or more of the driveline actuators.

For some embodiments, at least one of the values of the plurality of driveline requests may be nullified by assigning arbitrary high values to one or more of a plurality of weights of the cost function. In some embodiments, values for one or more of the weights of the cost function may be based on performance degradation of one or more of the driveline actuators. For some embodiments, a constraint vector of the linear program may contain values respectively corresponding with the plurality of driveline requests. In some embodiments, the one or more driveline controls may include at least one wheel torque allocation.

In some embodiments, the linear program may include a constraint vector b, a variable vector x, a matrix of coefficients A, and a cost vector $c^T$, and the cost function may be the product of the cost vector $c^T$ and the variable vector x.

For some embodiments, the cost vector $c^T$ may be a row vector having a number of entries equal to the number $N_C$ of driveline controls and twice the number $N_R$ of driveline requests. The first $N_C$ entries of the cost vector $c^T$ may be zero, and the last $2*N_R$ entries of the cost vector $c^T$ may comprise the plurality of weights.

In some embodiments, the variable vector x may be a column vector having a number of entries equal to the sum of the number $N_C$ of driveline controls and twice the number $N_R$ of driveline requests. The first $N_C$ entries of the variable vector x may respectively correspond with the values of the plurality of driveline controls, and the last $2*N_R$ entries of the variable vector x may comprise a set of slack variables.

For some embodiments, the matrix of coefficients A may be a matrix having a number of rows equal to the number $N_R$ of driveline requests, and having a number of columns equal to the sum of the number $N_C$ of driveline controls and the number $2*N_R$ of driveline requests. The first $N_C$ columns of the matrix of coefficients A may correspond with the plurality of driveline controls, and the last $2*N_R$ columns of the matrix of coefficients A may contain an $N_R$-by-$N_R$ identity matrix and a negated $N_R$-by-$N_R$ identity matrix.

In some embodiments, the constraint vector b may be a column vector having a number of entries equal to the number $N_R$ of driveline requests, and the $N_R$ entries of the constraint vector b may respectively correspond with the values of the plurality of driveline requests.

Figure 5:
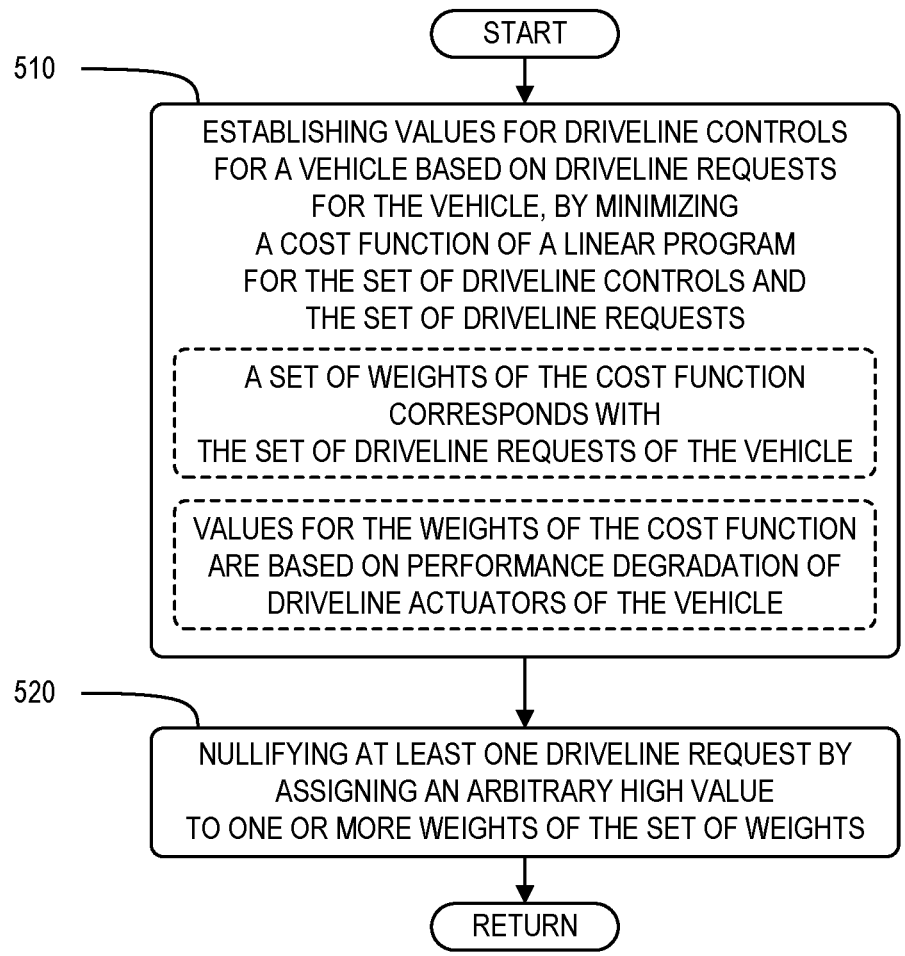
FIG. 5 shows a flow chart of a method for controlling vehicle drivelines in accordance with one or more embodiments of the present disclosure.

FIG. 5 shows a flow chart of a method 500 for controlling vehicle drivelines. Method 500 may comprise a first portion 510 and a second portion 520. In first portion 510, values for a set of driveline controls for a vehicle (e.g., driveline controls for a control allocation subsystem such as control allocation subsystem 310) may be established based on a set of driveline requests for the vehicle (e.g., driveline requests for a control allocation subsystem such as control allocation subsystem 310), by minimizing a cost function of a linear program for the set of driveline controls and the set of driveline requests. A set of weights of the cost function may correspond with the set of driveline requests of the vehicle. In second portion 520, at least one of the driveline requests may be nullified by assigning arbitrary high values to one or more weights of the set of weights.

In some embodiments, the linear program may include a matrix of coefficients A having a number of rows equal to the number of driveline requests. For some embodiments, the set of driveline requests may include one or more of: a total torque request; a total yaw moment request; a traction control target for a wheel; and a torque limit for a wheel. In some embodiments, values of the set of weights of the cost function may establish a prioritization among the set of driveline requests. For some embodiments, values for one or more of the weights of the cost function may be based on performance degradation of one or more driveline actuators of the vehicle.

Thus provided herein are methods and systems and for using the weights of cost functions to improve linear-program-based vehicle driveline architectures and systems. In driveline architectures such as architecture depicted in FIGS. 1A and 1B, a vehicle may have separate motors independently supplying torque to its wheels. As FIGS. 2 and 3 show, a control allocation subsystem may receive or process various driveline requests, and may generate or transmit various driveline controls. The control allocation subsystem may then employ a linear program relating a constraint vector b (which may include values of the driveline requests), a variable vector x (which may include values of the driveline controls, as well as slack variables), a matrix of coefficients A, and a cost vector $c^T$ (which may include values of weights corresponding with the driveline requests). The driveline requests may be reprioritized (and/or deprioritized) by adjusting the values of the weights of cost vector $c^T$.

In a first approach to the methods and systems discussed herein, a first example of a method comprises: establishing values for a plurality of driveline controls of a linear program based on values of a plurality of driveline requests of the linear program, the driveline controls respectively corresponding with a plurality of driveline actuators; and adjusting the plurality of driveline actuators based upon the values for the plurality of driveline controls, wherein the values for the plurality of driveline controls are established based on values of a plurality of weights of a cost function of the linear program, the plurality of weights respectively corresponding with the plurality of driveline requests. In a second example of the method building off of the first example, at least one of the values of the plurality of driveline requests is nullified by assigning arbitrary high values to one or more of a plurality of weights of the cost function. In a third example of the method building off of either the first example or second example, values for one or more of the weights of the cost function are based on performance degradation of one or more of the driveline actuators. In a fourth example of the method building off of any of the first example through the third example, a constraint vector of the linear program contains values respectively corresponding with the plurality of driveline requests. In a fifth example of the method building off of any of the first example through the fourth example, the one or more driveline controls includes at least one wheel torque allocation. In a sixth example of the method building off of any of the first example through the fourth example, the linear program includes constraint vector b, a variable vector x, a matrix of coefficients A, and a cost vector $c^T$; and the cost function is the product of the cost vector $c^T$ and the variable vector x. In a seventh example of the method building off of the sixth example, the cost vector $c^T$ is a row vector having a number of entries equal to the number $N_C$ of driveline controls and twice the number $N_R$ of driveline requests; the first $N_C$ entries of the cost vector $c^T$ are zero; and the last $2*N_R$ entries of the cost vector $c^T$ comprise the plurality of weights. In an eighth example of the method building off of either the sixth example or the seventh example, the variable vector x is a column vector having a number of entries equal to the sum of the number $N_C$ of driveline controls and twice the number $N_R$ of driveline requests; the first $N_C$ entries of the variable vector x respectively correspond with the values of the plurality of driveline controls; and the last $2*N_R$ entries of the variable vector x comprise a set of slack variables. In a ninth example of the method building off of any of the sixth example through the eighth example, the matrix of coefficients A is a matrix having a number of rows equal to the number $N_R$ of driveline requests, and having a number of columns equal to the sum of the number $N_C$ of driveline controls and the number $2*N_R$ of driveline requests; the first $N_C$ columns of the matrix of coefficients A correspond with the plurality of driveline controls; and the last $2*N_R$ columns of the matrix of coefficients A contain an $N_R$-by-$N_R$ identity matrix and a negated $N_R$-by-$N_R$ identity matrix. In a tenth example of the method building off of any of the sixth example through the ninth example, the constraint vector b is a column vector having a number of entries equal to the number $N_R$ of driveline requests; and the $N_R$ entries of the constraint vector b respectively correspond with the values of the plurality of driveline requests.

In a second approach to the methods and systems discussed herein, a first example of a system for controlling drivelines of a vehicle, comprises: four driveline controls for controlling four driveline actuators; and one or more driveline control allocation circuitries operable to establish a distribution of four torque values for the four driveline controls based on values of a plurality of driveline requests, wherein the four torque values correspond with a minimized value of a cost function of a linear program; and wherein at least one of the values of the plurality of driveline requests is nullified by assigning arbitrary high values to one or more of a plurality of weights of the cost function. In a second example building of the system building off of the first example, at least one of the four actuators is a torque actuator. In a third example building of the system building off of either the first example or the second example, the distribution of the four torque values is established by a single driveline control allocation circuitry. In a fourth example building of the system building off of any of the first example through the third example, the values of the plurality of the plurality of driveline requests are established by one or more dynamics subsystems. In a fifth example of the system building off of the fourth example, the one or more dynamics subsystems comprise at least one of: a subsystem for yaw control, a subsystem for side-slip angle control, and a subsystem for traction control.

In a third approach to the methods and systems discussed herein, a first example of a method of controlling vehicle drivelines comprises: establishing values for a set of driveline controls for a vehicle based on a set of driveline requests for the vehicle, by minimizing a cost function of a linear program for the set of driveline controls and the set of driveline requests, wherein a set of weights of the cost function corresponds with the set of driveline requests of the vehicle; and nullifying at least one of the driveline requests by assigning arbitrary high values to one or more weights of the set of weights. In a second example of the method building off of the first example, the linear program includes a matrix of coefficients A, having a number of rows equal to the number of driveline requests. In a third example of the method building off of either the first example or the second example, the set of driveline requests includes one or more of: a total torque request; a total yaw moment request; a traction control target for a wheel; and a torque limit for a wheel. In a fourth example of the method building off of any of the first example through the third example, values of the set of weights of the cost function establish a prioritization among the set of driveline requests. In a fifth example of the method building off of any of the first example through the fourth example, values for one or more of the weights of the cost function are based on performance degradation of one or more driveline actuators of the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle and systems described above with respect to FIGS. 1A through 3. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method comprising:
establishing values for a plurality of driveline controls of a linear program based on values of a plurality of driveline requests of the linear program, the driveline controls respectively corresponding with a plurality of driveline actuators; and
adjusting the plurality of driveline actuators based upon the values for the plurality of driveline controls, wherein the values for the plurality of driveline controls are established based on values of a plurality of weights of a cost function of the linear program, the plurality of weights respectively corresponding with the plurality of driveline requests;
wherein the linear program includes a constraint vector b, a variable vector x, a matrix of coefficients A, and a cost vector $c^T$; and
wherein the cost function is the product of the cost vector $c^T$ and the variable vector x;
wherein the cost vector $c^T$ is a row vector having a number of entries equal to the number $N_C$ of driveline controls and twice the number $N_R$ of driveline requests;
wherein the first $N_C$ entries of the cost vector $c^T$ are zero; and
wherein the last $2*N_R$ entries of the cost vector $c^T$ comprise the plurality of weights.

2. The method of claim 1, wherein at least one of the values of the plurality of driveline requests is nullified by assigning arbitrary high values to one or more of a plurality of weights of the cost function.

3. The method of claim 1, wherein values for one or more of the weights of the cost function are based on performance degradation of one or more of the driveline actuators.

4. The method of claim 1, wherein a constraint vector of the linear program constraint vector b contains values respectively corresponding with the plurality of driveline requests.

5. The method of claim 1, wherein the one or more driveline controls includes at least one wheel torque allocation.

6. The method of claim 1, wherein the variable vector x is a column vector having a number of entries equal to the sum of the number Nc of driveline controls and twice the number $N_R$ of driveline requests; wherein the first Nc entries of the variable vector x respectively correspond with the values of the plurality of driveline controls; and wherein the last $2*NR$ entries of the variable vector x comprise a set of slack variables.

7. A system for controlling drivelines of a vehicle, comprising:
four driveline controls for controlling four actuators; and
one or more driveline control allocation circuitries operable to establish a distribution of four torque values for the four driveline controls based on values of a plurality of driveline requests, wherein the four torque values correspond with a minimized value of a cost function of a linear program;
wherein at least one of the values of the plurality of driveline requests is nullified by assigning arbitrary high values to one or more of a plurality of weights of the cost function;
wherein the linear program includes a constraint vector b, a variable vector x, a matrix of coefficients A, and a cost vector $c^T$; and
wherein the cost function is the product of the cost vector $c^T$ and the variable vector x;
wherein the matrix of coefficients A is a matrix having a number of rows equal to the number $N_R$ of driveline requests, and having a number of columns equal to the sum of the number $N_C$ of driveline controls and the number $2*N_R$ of driveline requests;
wherein the first $N_C$ columns of the matrix of coefficients A correspond with the plurality of driveline controls; and
wherein the last $2*N_R$ columns of the matrix of coefficients A contain an $N_R$-by-$N_R$ identity matrix and a negated $N_R$-by-$N_R$ identity matrix.

8. The system of claim 7, wherein at least one of the four actuators is a torque actuator.

9. The system of claim 7, wherein the distribution of the four torque values is established by a single driveline control allocation circuitry.

10. The system of claim 7, wherein the values of the plurality of the plurality of driveline requests are established by one or more dynamics subsystems.

11. The system of claim 10, wherein the one or more dynamics subsystems comprise at least one of: a subsystem for yaw control, a subsystem for side-slip angle control, and a subsystem for traction control.

12. A method of controlling vehicle drivelines, the method comprising:
establishing values for a set of driveline controls for a vehicle based on a set of driveline requests for the vehicle, by minimizing a cost function of a linear program for the set of driveline controls and the set of driveline requests, wherein a set of weights of the cost function corresponds with the set of driveline requests of the vehicle; and nullifying at least one of the driveline requests by assigning arbitrary high values to one or more weights of the set of weights, wherein the linear program includes a constraint vector b, a variable vector x, a matrix of coefficients A, and a cost vector $c^T$; and wherein the cost function is the product of the cost vector $c^T$ and the variable vector x;

wherein the constraint vector b is a column vector having a number of entries equal to the number $N_R$ of driveline requests; and wherein the $N_R$ entries of the constraint vector b respectively correspond with the values of the plurality of driveline requests.

13. The method of claim 12, wherein the linear program includes a matrix of coefficients A, having the matrix of coefficients A has a number of rows equal to the number of driveline requests.

14. The method of claim 12, wherein the set of driveline requests includes one or more of: a total torque request; a total yaw moment request; a traction control target for a wheel; and a torque limit for a wheel.

15. The method of claim 12, wherein values of the set of weights of the cost function establish a prioritization among the set of driveline requests.

16. The method of claim 12, wherein values for one or more of the weights of the cost function are based on performance degradation of one or more driveline actuators of the vehicle.

* * * * *